(12) United States Patent
Suwanda

(10) Patent No.: US 6,210,616 B1
(45) Date of Patent: Apr. 3, 2001

(54) PROFILE EXTRUSION OF THERMOPLASTIC COMPOSITES WITH HIGH FILLER CONTENT

(75) Inventor: Dedo Suwanda, Mississauga (CA)

(73) Assignee: CRF Technologies Group Ltd., Ontario (CA)

(*) Notice: Subject to any disclaimer, the term of this patent is extended or adjusted under 35 U.S.C. 154(b) by 0 days.

(21) Appl. No.: 09/141,034

(22) Filed: Aug. 27, 1998

(51) Int. Cl.[7] ............................................. B29C 47/00
(52) U.S. Cl. .............. 264/151; 264/171.1; 264/177.19; 264/177.2; 264/210.6; 264/211; 264/211.12; 264/211.21; 264/130
(58) Field of Search .................. 264/171.1, 176.1, 264/177.2, 177.19, 211.12, 237, 327, 211.21, 148.151, 210.6, 211, 130

(56) References Cited

U.S. PATENT DOCUMENTS

| | | |
|---|---|---|
| 3,927,160 | * 12/1975 | Medley . |
| 4,442,243 | * 4/1984 | Woodhams . |
| 5,234,652 | * 8/1993 | Woodhams et al. . |
| 5,360,330 | * 11/1994 | Jensen et al. . |
| 5,399,308 | * 3/1995 | Woodhams et al. . |
| 5,474,722 | * 12/1995 | Woodhams . |
| 5,505,900 | * 4/1996 | Suwanda et al. . |
| 5,516,472 | * 5/1996 | Laver . |
| 5,702,786 | * 12/1997 | Robichaud . |
| 5,861,117 | * 1/1999 | Rosenbaum . |
| 5,863,480 | * 1/1999 | Suwanda . |

OTHER PUBLICATIONS

Plastics Engineering Handbook, 4th ed., Joel Frados, ed., p. 343, 1987.*

* cited by examiner

Primary Examiner—Jan H. Silbaugh
Assistant Examiner—Mark Eashoo
(74) Attorney, Agent, or Firm—Swabey Ogilvy Renault; Guy J. Houle

(57) ABSTRACT

An extrusion process and apparatus is described for the manufacture of a thermoplastic resin-filler composite product having a desired resin-filler mixture comprised of 60–20% by weight of a thermoplastic resin and 40–80% by weight of a filler. A resin-filler mixture, in homogeneous form, is extruded through a die at a temperature above the softening point of the resin to form an extrudate having a desired cross-sectional shape. The extrudate is then passed through a die land at a temperature of above the softening point. From the die land the extrudate is cooled in a cooled shaper and transferred thereto through a thermal barrier insert member which is disposed in contact between the die land and the cooled shaper whereby radial pressure to counteract radial expansion tendencies of the extrudate is maintained during the passage. The cooled shaper cools the extrudate to a temperature of about at least 20° C. below the softening point of the resin. A lubricant is applied to the exterior surface of the extrudate prior to feeding the extrudate to the cooled shaper.

10 Claims, 5 Drawing Sheets

PROFILE EXTRUSION OF THERMOPLASTIC COMPOSITES WITH HIGH FILLER CONTENT

FIELD OF THE INVENTION

The present invention relates to an extrusion process and apparatus for the manufacture of extruded profiles of thermoplastic composite materials with very high filler content.

In a specific embodiment, this invention relates to cellulosic filler reinforced thermoplastic composites that have strength and modulus comparable to those of wood and engineered wood products such as particleboard, medium density fibreboard (MDF), plywood, etc. More specifically, the process involves the use of a cooled shaper attached directly to the end of the die via a thermal barrier. The cooled shaper solidifies the outer skin of the profile sufficiently to maintain the shape of the profile after it exits the cooled shaper. The profile exiting the cooled shaper is not drawn down and can be processed by conventional post extrusion equipment (vacuum calibrator, cut-off saw, etc).

BACKGROUND OF THE INVENTION

Profile extrusion processes have been developed over many years. For example, various types of pipe have been produced by extruding rigid PVC (polyvinylchloride), HDPE (high-density polyethylene) and ABS (acrylonitrile-butadiene-styrene). Complex profiles, such as window frame, siding, fencing and decking components have also been made with these processes, using, for example, rigid PVC. The manufacture of these products is conducted using polymers with no or relatively low filler content (less than 40% by weight).

The conventional profile extrusion process requires conditions where the temperature at the extrusion die is well above the melting/softening point of the polymer. The profile exits the die in molten form, and is received in a vacuum sizing tank/calibrator, which prevents the profile from collapsing. The vacuum sizing tank/calibrator comprises a solid structure with a bore therethrough matching the size and shape of the extruded profile. The dimension and shape of the profile is maintained by applying vacuum to the outer part of the profile while it is cooled.

In the conventional profile extrusion process, the sizing vacuum tank/calibrator is not attached to the die. Therefore, it is necessary that the profile exiting the die does not swell nor melt fracture because the vacuum sizing tank/calibrator cannot accommodate extrudate which has undergone die swell and melt fracture. Die swell and melt fracture are typical phenomena in profile extrusion when the temperature of the polymer in the die is too low and/or the viscosity of the molten polymer/composite at the die is too high. This phenomenon is usually accompanied by high-pressure drop across the die. To prevent these problems profile extruders typically employ a puller downstream of the die. The puller draws down the gauge of the profile, counteracting the effects of die swell. The puller also lowers the die head pressure.

Known processes for the manufacture of composites with high filler content mainly involve compression molding, where a mixture of resin and filler is shaped in a mould by pressing the two parts of the mould together. Most of these processes use thermosetting resins, such as urea-formaldehyde resins and melamine-formaldehyde, as the binder/matrix, but some processes use thermoplastic resins.

With the thermosetting resins, the product can contain up to 95% by weight of filler, because the binder is in liquid form prior to a curing reaction. Mixing of such a liquid with the filler can be done in a conventional mixer. Particleboard (using wood particles) and MDF or medium density fibreboard (using wood pulp) are typical examples of such composites. The mixture is then compression molded into sheet/board (particleboard and MDF) or into various shapes, and heat is applied to cure the resin. Once the curing process is complete, the product is cooled and released from the mould. Products made from thermosetting resins are usually non-recyclable because thermosetting resin cannot be re-melted and re-shaped once it is cured.

Recently, interest has developed in completely recyclable products. Much effort has been put into replacing thermosetting resins with thermoplastic resins, especially those available in abundance in the post consumer recycling stream, such as fractional melt (high viscosity) HDPE from bottles and film (bags). With thermoplastic resins, melt-mixing (compounding) of the resin and the filler is required. Twin screw extruders and kneaders are most commonly used for this purpose, but they are limited to relatively low filler content or thermoplastic resins with relatively low viscosity. This excludes mixing of fractional melt HDPE with amounts of filler of 40% to 60% by weight.

At least three other processes have been proposed for melt-mixing or compounding thermoplastic resin with up to 80% by weight of filler. They are all based on a high speed, high shear thermokinetic mixing process. Once the compound is prepared by mixing it is shaped into the final product. Using compression moulding, this compound can be shaped into sheet/board and other shapes. Extrusion of such a compound has also been explored.

U.S. Pat. No. 5,516,472 to Laver discloses a process for combining an organic fibrous material with a thermoplastic material forming a wood imitation composite. The process comprises the steps of dry-blending the raw materials, melt blending them in an extruder, passing the homogenous mixture through a transition die to pre-shape the mixture and to expand the mixture, passing the mixture through a stranding die to form a plurality of strands, and finally passing the plurality of strands through a moulding die for a time sufficient to compress the strands together and bond the strands to each other. The preferred formulation of Laver's invention is approximately 65% wood flour, 26% high density polyethylene over 3% processing aid and over 5% thermoset.

U.S. Pat. No. 5,474,722 to Woodhams discloses a process to produce a high modulus article consisting of a composite of an oriented plastic material and an oriented particulate material. The orientation results from forcing the molten composite material through a converging passage to produce an extrudate, deforming the extrudate while maintaining the extrudate at or close to its melting temperature (1–10° C. above the melting temperature) to produce an oriented deformed extrudate, and cooling the deformed extrudate to preserve the orientation.

PCT Publication WO 94/11174 to Suwanda et al. discloses a similar process to that of Woodhams, i.e. a process for continuous production of filled thermoplastic compound containing filler, having oriented components. The process comprises the steps of bringing the material to a molten stage, but at a temperature just above the softening temperature (0–10° C. above the melting temperature), forcing the molten material through a converging die to impart longitudinal orientation to the polymer and the filler particulates, and cooling the compound to preserve the orientation.

The Laver process results in extrudate with poor structural characteristics due to the large amount of processing aid.

Also the thermosetting components would degrade upon recycling of the material. This would cause the physical properties to degrade as well. Both processes of Woodhams and Suwanda claim to be able to extrude thermoplastic compound with up to 80% filler by weight into profiles. Both also concentrate on designing the converging flow through the die to control the elongational strain necessary to create the orientation of polymer molecules as well as the filler particulates.

SUMMARY OF THE INVENTION

The present invention provides a process and an apparatus for the continuous production of extruded profiles of thermoplastic composites with very high filler content. Such processes and apparatus may be used for the production of both solid and hollow profiles. A thermoplastic compound is provided comprising a mixture of thermoplastic polymer and filler particles. The thermoplastic compound is fed into an extruder where it is melted and pushed through a specially designed die assembly.

The die assembly comprises one or more die parts, a corresponding number of die lands to follow each die part, and a cooled shaper, and, in the case of hollow profiles, a mandrel. A die is defined as a part where a change in the profile shape, i.e., deformation, takes place. The die land is the straight part following the die, through which the extrudate moves without a change in profile shape, allowing the extrudate to relax from the stresses of extrusion deformation.

The material deformation from the shape of the extruder barrel (necessarily circular) to the final desired profile may be conducted in one step, using one die or multiple steps, using multiple dies arranged in series. The die(s) is (are) designed to ensure balanced flow can be attained at high speed and low pressure drop. After each deformation in a die, the material is stabilized and allowed to relax from residual stresses resulting from deformation in the die, using the die lands. The length of the die land is typically 2–20 times the effective diameter (diameter of a circular profile having the same area as the profile).

The temperature of the compound in each die and die land is kept above the melting/softening point of the polymer to allow deformation and relaxation to take place. Optionally, lubricant may be introduced at this stage to reduce pressure drop caused by shear stress at the wall of each die and die land. Then the extrudate is fully or partially solidified in a long cooled shaper, up to 200 times the effective diameter of the extrudate. The cooling system in the shaper removes heat from the extrudate. The temperature of the cooled shaper is set low enough so that the extrudate form a solid skin of sufficient thickness before exiting the cooled shaper. The solid skin so formed must be thick enough to prevent molten composite material in the core of the extrudate from bulging or bursting through the solid skin, or otherwise deforming the profile. Significant pressure from the inner molten core is caused by the elastic nature of the molten plastic and by the foaming action of any residual moisture in the filler particles. As the extrudate is cooled, it also shrinks, reducing the friction between the composite and the wall of the cooled shaper. External lubricant is used at this stage, to reduce friction between the composite and the wall of the cooled shaper, before sufficient shrinking is achieved, otherwise the pressure drop across the cooled shaper will exceed the limit a conventional extruder can withstand. Due to the requirement of a sharp temperature drop between the die land and the cooled shaper, a heat barrier between these two pieces is used.

In the case of a hollow profile the die assembly includes a mandrel. The mandrel mirrors the actions of the aforementioned die, die land and cooling shaper. That is, the section of the mandrel corresponding to the die is of variable cross section in order to impart the required deformation to the profile. This section of the mandrel is neither heated nor cooled but is maintained at a temperature above the softening point of the melt due to heat transfer from the breaker plate, die and polymer melt. From the point the melt enters the die land, the mandrel has the approximate cross section of the final profile. Where the melt enters the cooled shaper the corresponding section of the mandrel is cooled. The mandrel is cooled by a cooling system fed through spider legs in the die. The cooling system is designed such that cooling is imparted in the section of the mandrel corresponding to the cooled shaper but not in the section corresponding to the die. Thus a thermal gradient is set up in the mandrel. The temperature in the die is above the softening point of the melt and in the cooled shaper is below the softening point of the melt. The hollow profile is cooled from both the outside and the inside in the area of the cooled shaper. As already mentioned, the cooling must create a sufficiently solid skin to prevent deformation of the profile. The cooling causes the profile to shrink, constricting it around the mandrel. The mandrel is slightly tapered towards the exit to reduce the resulting friction. Optionally, lubricant can be injected onto the inside surface. The lubricant may be fed to the mandrel via the spider legs.

For both hollow and solid profiles, the extrudate exiting the cooled shaper is conveyed to conventional downstream equipment. From the cooled shaper, the extrudate enters a vacuum sizer/calibrator. As in typical profile extrusion processes, a puller passes the extrudate to a cut off saw and dump table. However, the puller is not operated with the same purpose found in typical profile extrusion processes. The puller does not pull the extrudate with enough force to deform the extrudate as it leaves the die assembly. The extrudate is not drawn down nor does the puller impart orientation. The puller operates at a linear speed equivalent to the average velocity of the composite in the cooled shaper. The puller acts primarily to support the extrudate and convey it to the cut off saws. The reason for this is that the extrudate will not swell on exiting the die assembly as in typical profile extrusion processes. The profile already has the required dimensions. It does not need to be drawn down. In fact operating the puller with a high torque would fracture the extrudate.

According to a broad aspect of the present invention there is provided an extrusion process for the manufacture of a thermoplastic resin-filler composite product. The product has a desired resin-filler mixture comprised of 60–20% by weight of a thermoplastic resin and 40–80% by weight of a filler. The process comprises extruding through a die the desired resin-filler mixture in a homogeneous form at a temperature above the softening point of the resin to form an extrudate having a desired cross-sectional shape. The extrudate is then passed through a die land at a temperature above the softening point. From the die land the extrudate is fed to a cooled shaper through a thermal barrier insert member which is disposed in contact between the die land and the cooled shaper whereby radial pressure to counteract radial expansion tendencies of the extrudate is maintained during the passage. The cooled shaper has cooling means to maintain the cooled shaper at a temperature of about at least 20° C. below the softening point of the resin to cool the extrudate below its softening point. A lubricant is applied to an exterior surface of the extrudate prior to feeding same to the cooled shaper.

According to a still further broad aspect of the present invention there is provided an extrusion apparatus for the manufacture of a thermoplastic resin-filler composite product having a desired resin-filler mixture comprised of 60–20% by weight of a resin and 40–80% by weight of a filler. The extrusion apparatus has a die through which a desired homogeneous resin-filler mixture is conveyed at a temperature above the melting point of the resin in the mixture. A land is provided at an outlet end of the die and has a contoured channel to form a shaped extrudate. A cooled shaper of predetermined length and having a straight cooling channel of like contour to said contoured channel and aligned therewith is provided for cooling the extrudate. The cooled shaper has cooling means to maintain the cooling channel at a temperature below the melting point of the resin. A thermal barrier insert member is interposed in contact between an exit end of the land and an inlet end of the cooling channel in the cooled shaper to limit conduction of heat from the land to the cooled shaper. The thermal barrier insert member has a conducting contoured channel of like contour as the contoured channel of the land. Means is provided to inject a lubricant in the homogeneous resin-filler mixture.

According to a still further broad aspect of the present invention there is provided a thermoplastic resin-filler composite extruded product formed in accordance with the process above-described and comprising 60–20% by weight of a thermoplastic resin and 40–80% by weight of a filler.

In the case where the profile is hollow, no additional steps are necessary but the addition of a properly shaped mandrel is required. The mandrel contains a novel cooling system such that the section of the mandrel in the die is not cooled and the section of the mandrel in the cooled shaper is cooled. Thus the polymer passes through a temperature gradient such that the polymer composite is cooled on the inside in addition to the outside in the cooled shaper. The mandrel is tapered to a slightly smaller cross section at the exit of the cooled shaper so that the shrinkage of the polymer does not cause excessive friction between the composite and the mandrel.

DESCRIPTION OF PREFERRED EMBODIMENTS

Figure 1:
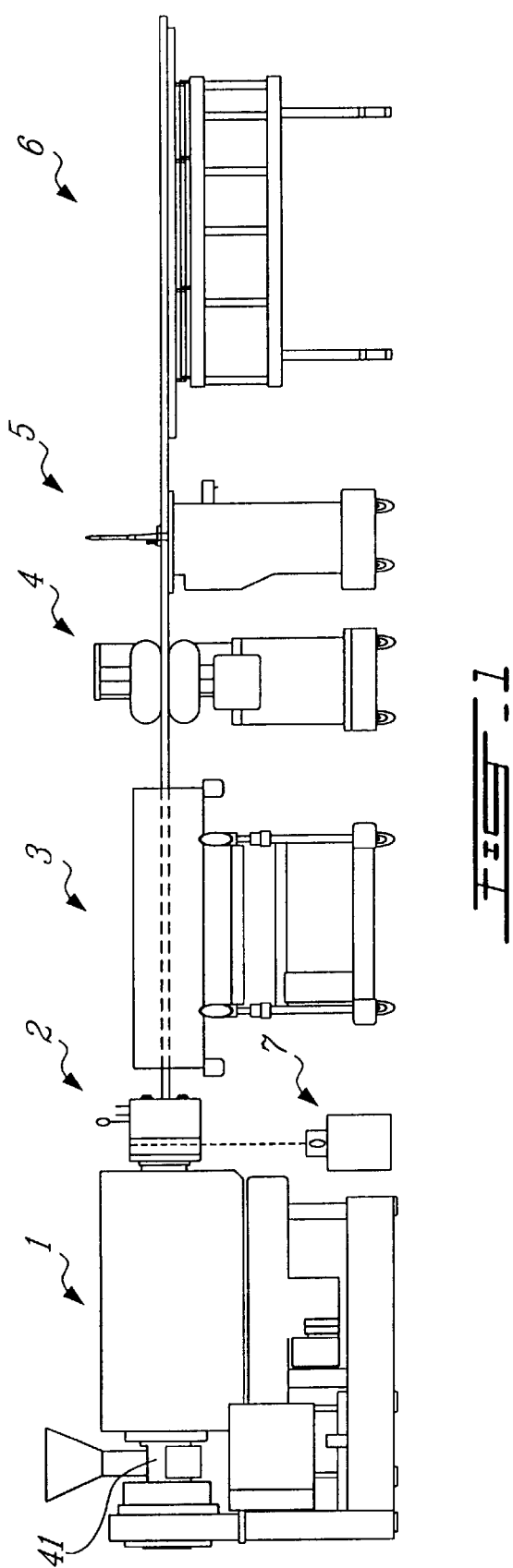
FIG. 1 is a simplified side view of an apparatus constructed in accordance with the present invention for producing extruded profile of thermoplastic composites with very high filler content.

Referring to FIG. 1, a thermoplastic compound with 40–80% by weight filler content with the remainder 60–20% by weight thermoplastic resin is continuously extruded using an extrusion apparatus, for example, a conventional plasticating extruder 1 (single or twin screw), through a die assembly 2 which includes a cooled shaper, into a vacuum or cooling tank 3, followed by a puller conveyor 4, a cut-off saw 5 and a dump table 6. A lubricant pump 7 is connected to the die assembly.

The compound is prepared a priori in a high speed, high shear thermokinetic mixer (not shown) which melts the thermoplastic component of the compound, breaks any agglomeration of filler particles, and disperses the filler particles, thus producing a homogenous compound. One or more additives may be needed to assist the dispersion of the filler particles, and to improve the bonds between the filler particles and the polymer.

Figure 2:
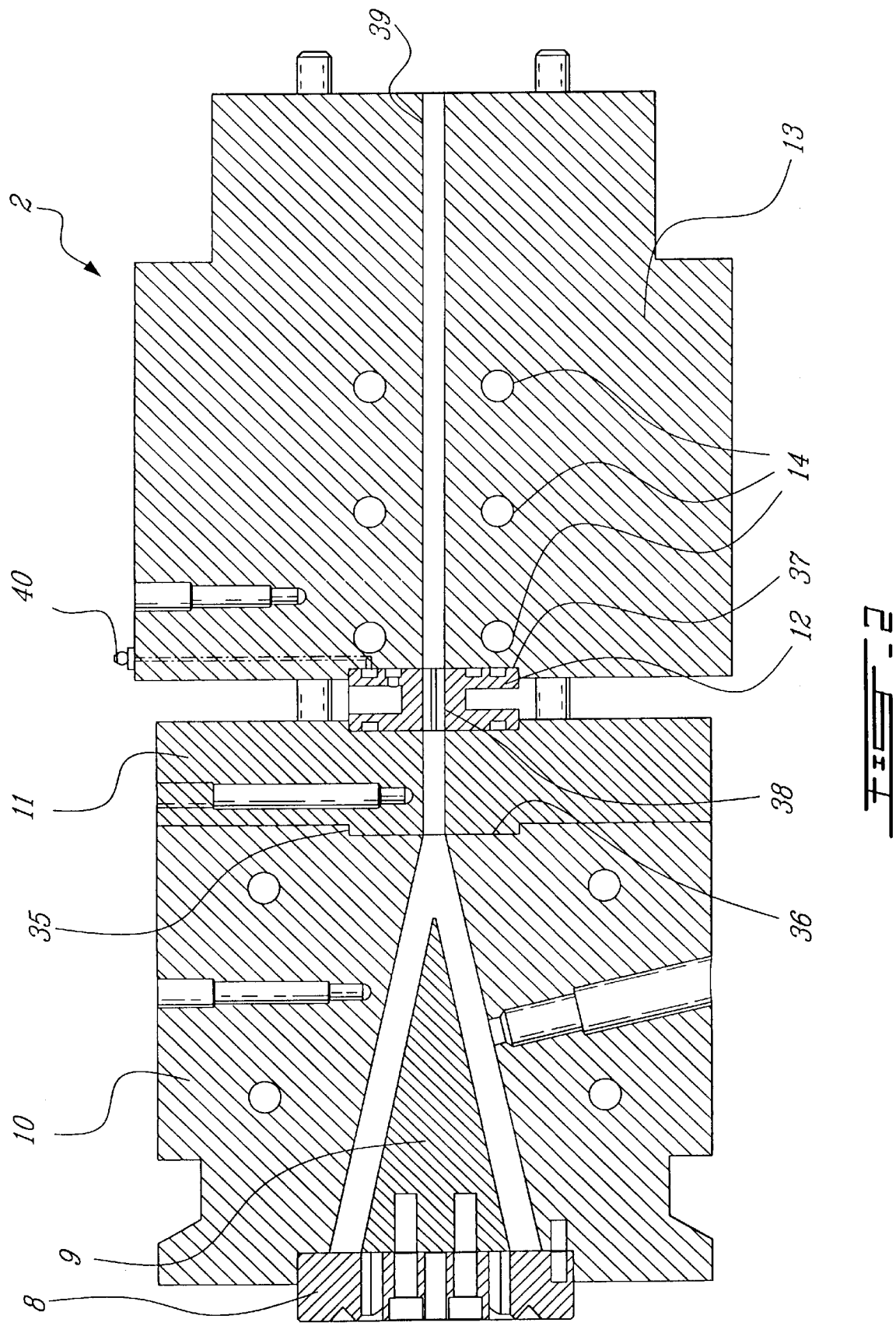
FIG. 2 is a detailed cross sectional view of a portion of the apparatus in FIG. 1, namely a die assembly for the production of a non-hollow profile.

The compound can be directly fed into a melt-fed extruder, but more commonly the compound is cooled and shaped into small particles suitable for feeding into a conventional extruder. In the latter case, the extruder re-melts the compound and pushes the material through the die assembly. When using cellulose filler, the preferred filler for the process of the invention, an extruder with ventilation is preferred in order to reduce the moisture level in the molten compound before it enters a die assembly. The temperatures of the extruder barrel zones should be low enough to prevent scorching of the cellulosic filler, and to allow the compound to be solidified before it exits the cooled shaper 13, as shown in FIG. 2. Typically the temperatures are between 140° C. and 180° C.

The thermoplastic component of the compound may comprise any thermoplastic polymer (i.e., polyethylene, polypropylene, polyvinylchloride, polystyrene, etc.). The polymer used depends on the desired properties of the final product. Thermosetting resins are excluded. Both virgin and recycled (waste) polymers can be used. For economic reasons, regrinds of high-density polyethylene (HDPE) from bottles and film are preferred.

In choosing between various grades of a particular polymer, attention should be paid to the fact that the molecular weight, and thus, viscosity, of a given grade can significantly affect the ease of processing. With the higher molecular weight polymer, a homogeneous compound is more difficult to achieve because of the higher polymer viscosity. However, a relatively high molecular weight HDPE (fractional melt HDPE) from waste bottles and film is preferred due to its abundance and low cost.

The filler component of the compound may be comprised of either or both reinforcing (high aspect ratio) and non-reinforcing (low aspect ratio) fillers. Aspect ratio is defined as the ratio of the length to the effective diameter. High aspect ratio offers an advantage, i.e., higher strength and modulus for the same level of filler content. Inorganic fillers include glass fibres, carbon fibres, talc, mica, kaolin, calcium carbonate and the like. Organic fillers include polymeric fibre and cellulose based filler.

Cellulose based filler is particularly important, and preferred, because of its low cost. It may be derived from wood/forest and agricultural by-products. Cellulose based filler also offers additional advantages: light weight, ability to maintain high aspect ratio after processing in high intensity thermokinetic mixer and low abrasive properties (thus, extending machine life).

However, cellulose based filler has several disadvantages including poor moisture resistance, biodegradability and poor flame resistance. In addition, cellulosic fillers are highly hygroscopic. In the raw form, cellulose fibres can absorb moisture in excess of 40% by weight. Prior to compounding, the cellulosic filler particles should be dried to less than 10% by weight moisture content. After compounding and during storage, the compound can absorb moisture again to an equilibrium level, which is dependent on the temperature and humidity of the environment. On a hot and humid day, the moisture level of the compound can reach as high as 10% of the weight of the cellulosic filler. Therefore, pre-drying of the compound prior to extrusion or the use of ventilated extruder are recommended to reduce the moisture level of the compound prior to entering the die assembly. For these reasons it is sometimes desirable to use inorganic fillers to partially or completely replace the cellulose fibre.

To promote complete and uniform dispersion and compatibilization of the filler particles with the polymer, it is recommended to use one or more additives, for example, dispersing/coupling agents. This agent wets the surface of the filler particles providing improved dispersion and adhesion. Carboxylated and maleated polyethylenes have been found most effective for compounds based on HDPE. Other agents, such as titanates and zirconates may also be used.

Due to the high filler content (40–80% by weight) and high molecular weight of polymer (such as fractional melt HDPE) of the compounds used in preferred embodiments of the process, the mixing process cannot be done in conventional compounding equipment, such as extruders (single and twin screw) and most high intensity mixers (Henschel, Banbury, etc.). Compounding is ideally conducted in a high intensity thermokinetic mixer, such as Gelimat* mixer (Draiswerke), LEX* Mixer (Lex) and K-Mixer* (Synergistics). It is a semi-batch process, where pre-weighed polymer and filler are fed into a chamber with a blade rotating at a speed up to 3000 RPM.

* (Registered Trade Mark)

The heat required to melt the polymer is derived from the high shearing of the material. In addition, the high intensity mixing action also reduces the size of oversized particles, separates the particles into fibres (thus improving reinforcing ability) and mixes the two components together. Compared to other compounding equipment, the high intensity thermokinetic mixers produces a more homogeneous compound, which is necessary for producing products with higher tensile, flexural and impact strengths and water resistance.

The die assembly used in the preferred process according to the invention comprises shaping, stabilization and solidification stages. The first two stages (shaping and stabilization) are commonly applied in regular profile extrusion, i.e., for thermoplastic compounds with no or low filler content. The last stage, i.e., the solidification stage is novel. The solidification stage has been designed to extrude highly filled thermoplastic compounds into profiles. Conventional profile extrusion processes employs a vacuum or cooling tank, which is not directly attached to the die assembly, to bring molten extrudate into a solid profile. In the present process, the solidification of extrudate begins to take place in the last part of the die assembly, i.e., the cooled shaper, which is in direct contact with the die land, via a thermal heat barrier. The vacuum/cooling tank is used to further cool the extrudate to achieve complete solidification and to ease the handling of the extrudate.

The die shapes the molten compound to the final shape of the profile. The die must be contoured so that a balanced and streamlined flow is achieved. Such a contour can usually be simulated using various polymer flow simulation packages using finite element and finite difference calculations for a given compound. For a compound with such high filler content, the design of the contour is aimed at minimizing pressure drop across the die, increasing the throughput and reducing flow instability (imbalance flow, melt fracture and die swell).

The extrudate is stabilized after deformation in the die. This is done in a die land at a temperature above the melting/softening point. Thus a more balanced flow is achieved. Simultaneously, the compound is relaxed from the stresses resulting from the deformation.

The last part of the die assembly, the cooled shaper, is set at a low enough temperature so that the extrudate will be fully or partially solidified in the cooled shaper. Accordingly, there is a large temperature differential between the end of the die land and the cooled shaper. The extrudate must not be radially unconstrained at this point; otherwise radial forces within the heat-softened mixture will cause expansion and loss of profile shape. Therefore, an open space between the die land and the cooled shaper, to limit the heat transfer therebetween, cannot be arranged. This would cause the unconstrained profile to swell. It would be impracticable to force the swollen profile into the cooled shaper. Instead, the cooled shaper and die land are in direct contact via a thermal barrier.

Lubricant is also applied to the surface of the extrudate as it enters the cooled shaper. This eases the passage of the extrudate through the cooled shaper. The solid extrudate leaving the die assembly is then conveyed through conventional equipment normally used for profile extrusion, e.g., cooling bath, puller, cut-off saw and dump table.

According to the preferred embodiments of the invention, no significant tension can be applied on to the extrudate, because molten compound has very low tensile strength. Tension at the extrudate can cause tensile failure at the die or die land where the compound is still hot. Therefore, this process is highly dependent on the pushing mechanism from the extruder.

Referring to FIG. 1, the extrusion apparatus 1, which may be one of many different types of single or twin screw extruders known to those skilled in the art, is used to melt and convey the plastic composite material through a passageway in the die assembly 2 shown in detail in FIG. 2. The processing conditions in extrusion apparatus 1 are chosen to ensure that the composite material is completely melted without causing excessive torque to the extruder drive and scorching the cellulosic filler. An extruder with ventilation is recommended to reduce the moisture level in the compound.

FIG. 2 shows a cross-section of a die assembly for producing a non-hollow profile. By way of example, the die assembly is configured for producing the non-hollow profile shown in FIG. 3. It will be appreciated by someone skilled in the art that this process applies to a variety of profiles.

Referring to FIG. 2, the die assembly for a non-hollow profile comprises of a die 10, a land 11, a thermal barrier 12 and a cooled shaper 13. The conveying action of the extruder screw located in the extruder barrel forces the molten compound through a commonly used breaker plate 8 into the die 10. This die 10 is so shaped that it will deform the molten compound from the circular shape of the extruder barrel into the shape of FIG. 3. A cone 9 is used to improve the flow balance from the breaker plate 8 to the land 11. The downstream end of the die 10 contacts the upstream end of a die land 11. The die 10 has a recessed portion 35 into which a protruding portion 36 on the surface of the die land 11 protrudes, as in a male and female connection. In the die land 11 the material flow is stabilized and relaxed after a deformation.

The die land 11 is in contact with a thermal barrier 12, which in turn is in contact with the cooled shaper 13. The thermal barrier 12 has a purposely small cross section to limit conduction of heat from the land 11 to the cooled shaper 13. The cooled shaper 13 and die land 11 are effectively thermally insulated from one another by the thermal barrier 12. Thus the cooled shaper 13 and land 11 can be maintained at different temperatures. The die land is maintained above the melting point of the profile. The cooled shaper is below the melting point of the polymer. Typically the cooled shaper is maintained at a temperature less than 30° C. Thus the temperature drop across the thermal barrier is as much as 150° C. for HDPE-cellulose composites. The thermal barrier 12 fits into the recess 37 in the cooled shaper 13 and die land 11. The channel 38 through the thermal barrier 12 matches that of the land 11 and cooled shaper 13. An oil injection fitting 40 supplies lubricant to the composite material for the purpose as described herein. It is pointed out that a lubricant may also be mixed with the composite material in the mixer and this lubricant will bleed to the surface of the composite material and provide the same result. Accordingly, the lubricant need not be injected at the inlet of the cooled shaper 13.

The cooled shaper 13 is the last part of the die assembly. It has a straight channel 39 of the final desired dimension of the product. Holes for the cooling system 14 provide intense cooling. The cooled shaper 13 cools the molten extrudate as quickly as possible so that the extrudate will be fully or partially solidified before exiting the cooled shaper. As the molten extrudate flows in the channel 39 of the cooled shaper 13, heat is transferred from the compound to the metal block of the cooled shaper 13, then to a cooling fluid flowing through passageways in the cooled shaper 14. Various designs of cooling system and various types of cooling fluid are known to those skilled in the art.

While the die land 11 is intended to stabilize the material flow and relax the material from any residual stresses and orientation resulted from deformation in the die 10, the cooled shaper 13 is intended to maintain the desired shape of the extrudate while it is solidified. Without the cooled shaper 13, not only would the extrudate melt fracture, it would also swell due to the elastic property of the polymer and the existence of residual moisture (especially in the case of cellulosic fillers) which can act as a foaming agent.

The length of the cooled shaper 13 is selected based on the cooling capability (heat transfer and design) and production speed. For the same cooling capability, the length of the cooled shaper 13 is proportional to the extrusion speed. However, the length of the cooled shaper 13 must be limited for economic reasons by improving the efficiency of heat removal from the extrudate. The cooled shaper 13 can be cooled using various heat transfer liquids, including water, directed to flow through channels or passageways 14 in the cooled shaper metal block near the extrudate channel 39. Cooling techniques are known to persons skilled in the art, as previously mentioned.

As the extrudate solidifies, the material will shrink and reduce the pressure it exerts on the surface of the metal in the shaper 13. As a result, the friction between the solid extrudate and the inner surface of the cooled shaper is reduced, but not eliminated. Therefore, it is sometimes necessary to have external lubricant at the interface to further reduce the friction. Without the lubricant, the pressure drop across the cooled shaper can exceed the acceptable limit of the extruder. Also the molten core may flow faster through the channel inside the solid skin formed in the cooled shaper, than the flow of the solid skin, disturbing the balance of material flow. The lubricant should be injected as early as possible to allow good distribution around the profile, but after the extrudate is partially cooled to avoid absorption of lubricant by the cellulosic filler. In this particular embodiment the external lubricant may be injected through an injection port located at the thermal barrier (see FIG. 4). Various types of lubricant can be used, such as silicone oil, wax, fatty acids, etc.

Figure 3:
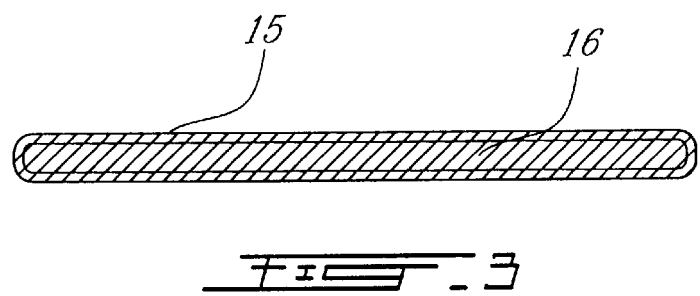
FIG. 3 is a cross section of a solid profile extruded employing the die assembly of FIG. 2.

Referring to FIG. 3 the profile produced by the die assembly of FIG. 2 is shown. This cross section shows a solid skin 15 surrounding a molten core 16. Solid skin 15 is formed near the cooled shaper 13 wall. As the extrudate moves along the cavity in the cooled shaper 13, the solid skin 15 becomes thicker, while the molten core 16 becomes thinner. As the extrudate exits the cooled shaper 13 to the open atmosphere, the solid skin 15 must be thick enough to provide strength to prevent the molten core 16 from bursting. The pressure that causes bursting comes from two main sources: the elastic property of the molten thermoplastic compound after undergoing various stresses and deformation (memory effect) and the presence of moisture in the cellulose which will act as foaming agent at an elevated temperature. Therefore, material formulation and preparation can affect the ease of processing. For example, decreasing the thermoplastic component in the compound or using thermoplastics with low elastic property can reduce the overall elastic property of the compound. The present process works well with thermoplastic compound with filler content in excess of 40% by weight. In addition, reducing the moisture content in the compound, preferably below 10% of the weight of the cellulosic filler, is also beneficial to the process.

Figure 4:
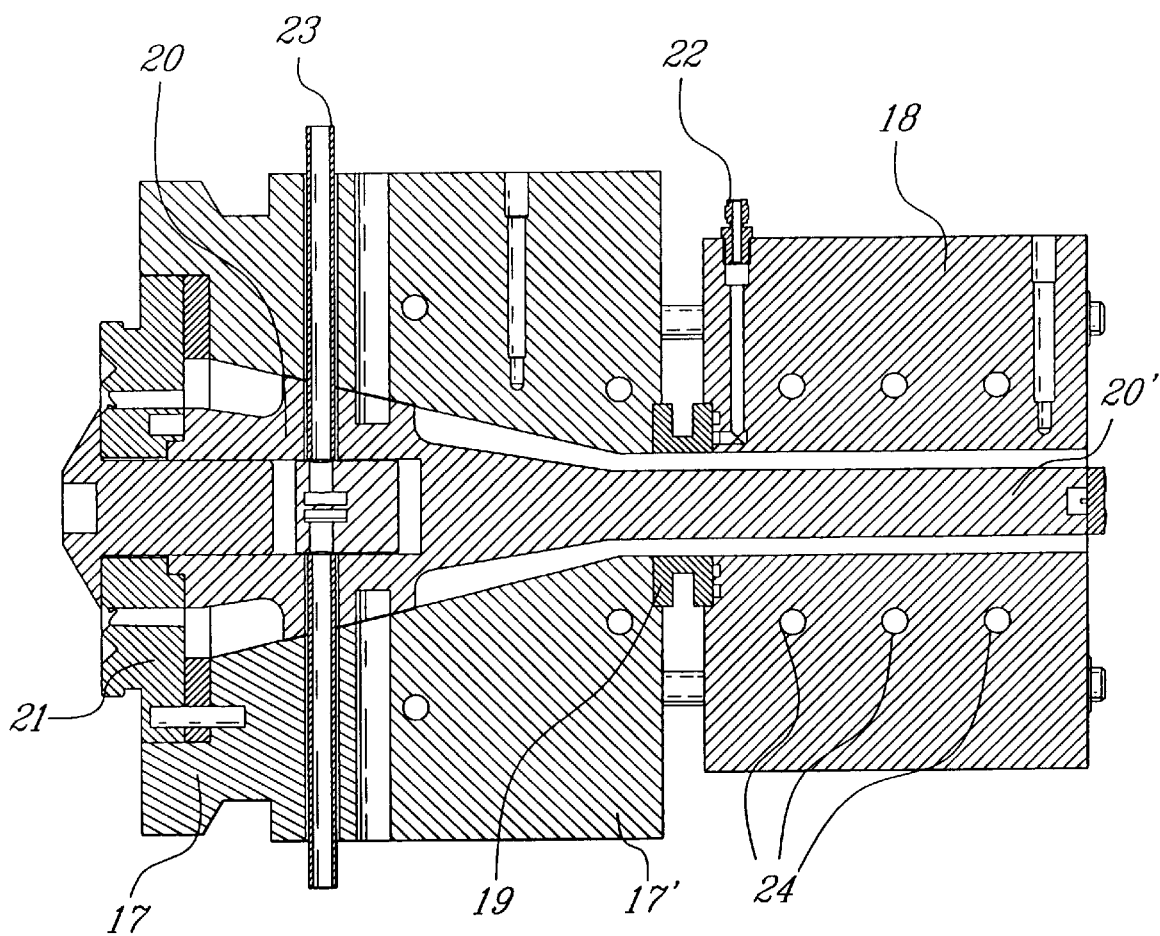
FIG. 4 is a detailed cross sectional view of a portion of the apparatus in FIG. 1, namely a die assembly for the production of a hollow profile.
Figure 6:
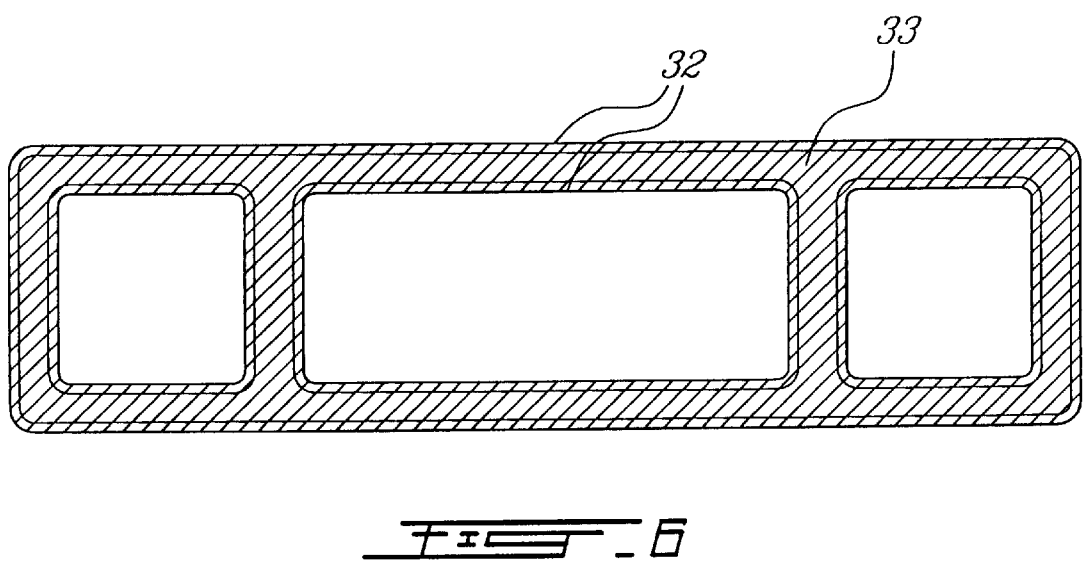
FIG. 6 is a cross section of a hollow profile extruded employing the die assembly of FIG. 4.

FIG. 4 shows a cross section of a specific embodiment of the present invention for the production of a hollow profile, as shown in FIG. 6. Referring to FIG. 4, the compound enters the breaker plate 21 from the screw tip. The breaker plate 21 homogenizes the melt. The polymer then enters the channel formed by the annulus between the die 17 and the mandrel 20. The die 17 is heated to a temperature above the softening point of the composite. It should be noted that in this embodiment of the present invention the last length of the die 17 acts as the die land 17'. It is of constant cross-section to allow the material to relax. In effect the die 17 and the die land 17' are integral.

The mandrel 20 in this region is not heated but is maintained at a temperature above the softening point of the compound by conductive heat transfer from the breaker plate and the die. From this point the composite converges to the end of the channel to the thermal barrier member 19 and the cooled shaper 18. The cooled shaper 18 contains holes for cooling system 24, which traverse the perimeter of the cooled shaper. The thermal barrier member 19 and the cooled shaper 18 are of the same design and purpose as those described for the solid profile above. For the hollow profile the mandrel 20 is cooled in the section in the cooled shaper 18. Cooling fluid is supplied to the mandrel 20 by pipe 23. The cooling system in the mandrel 20 is such that the cooling water is insulated from the mandrel 20 in the section of the die but cools the mandrel 20 in the section 20' of the cooling shaper. Thus the hollow profile can be cooled on both the inside and outside to create a solid skin. Lubricant is supplied by the oil injection fitting 22.

Figure 5:
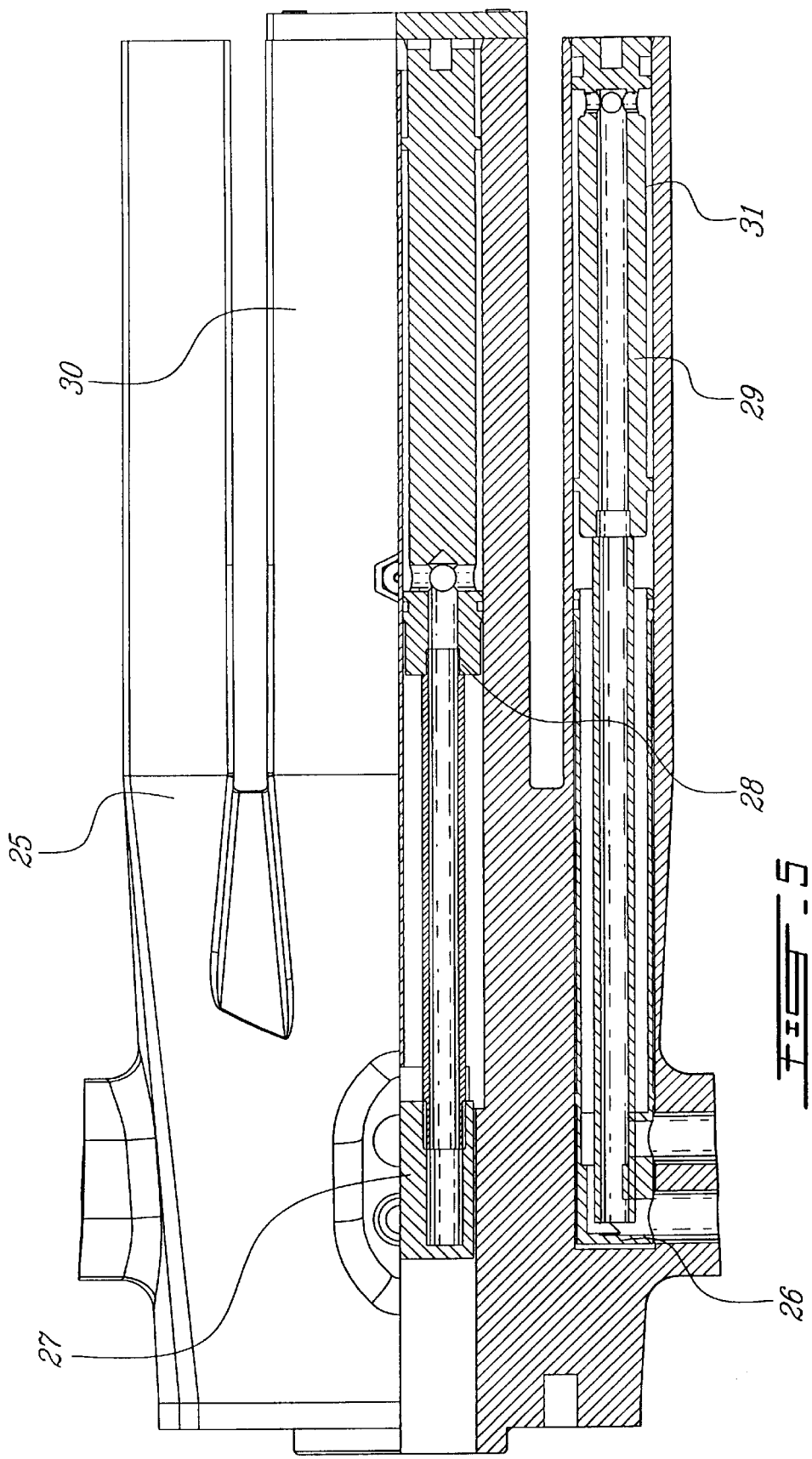
FIG. 5 is a vertical cross-section through the mandrel of the die assembly in FIG. 4.

The cooling system of the mandrel is best illustrated by FIG. 5. This figure shows a section of the mandrel 25 and cooling system. Cooling fluid enters the cooling system for the outer leg 31 in the cooling end 26. The fluid flows through the center pipe of the cooling rod 29. At the end of the cooling rod 29 the fluid exits the enter pipe radially and travels back to the cooling end 26. In the section of the cooling shaper the cooling fluid is in intimate contact with the mandrel, thus cooling the composite. The fluid is insulated from the mandrel in the section of the die by an additional pipe. A thermal gradient exists such that the mandrel is below the softening point of the composite in the area of the cooled shaper and above the softening point of the composite in the area of the die.

The cooling fluid enters the cooling system for the inner leg 30 via a cooling insert 27. The fluid travels in a pipe of the cooling subassembly 28 insulated from the mandrel to a point where it is forced out radially and comes into contact with the mandrel. The fluid travels to the end of the mandrel and then back to the cooling insert 27 in a similar assembly in the mirrored half of the inner leg (not shown).

FIG. 6 shows the hollow profile produced by the die assembly of FIGS. 4 and 5. FIG. 6 illustrates the solid skin 32 encompassing the molten core 33. The solid skin 32 grows in thickness as the composite passes through the cooled shaper. At the exit of the shaper the solid skin 32 must be of sufficient thickness to resist deformation. In the vacuum sizer the profile is further cooled so that the entire profile is solid.

The overall design of the die assembly is aimed at obtaining balanced flow (which is very critical for non-symmetrical profiles), reducing pressure drop across the die assembly and minimizing surface defects, such as shark skin, melt fracture and extrudate swell. Considering the high melt viscosity of the compound, such defects are difficult to avoid in a conventional profile extrusion.

The melt viscosity of a compound with 50% by weight of fractional melt HDPE and 50% by weight of cellulosic filler at a shear rate of 100 s$^{-1}$ and 180° C. is 7000 Pa-s, as compared to that of the same HDPE at the same conditions is 450 Pa-s. For higher filler content, the difference will be even higher (more than two orders of magnitude). Computer simulation and actual experimentation prove that such a compound cannot be extruded in a conventional way, i.e., above the melting point, without surface defects. However, the process and apparatus of the present invention can be used to produce a smooth extrudate with controlled dimensions.

EXAMPLES

The following examples further illustrate the invention; however, they are not meant to limit the scope of the possible applications of the described invention.

Example 1

This example describes the production of the nonhollow profile of FIG. 3.

The thermoplastic compound used in this sample comprised 59 parts by weight fractional melt HDPE (MI=0.4) from milk bottles with no colour added (natural), 40 parts by weight of ground wood waste/saw dust (20–80 mesh) and 1 part by weight of maleated polyethylene (Fusabond MB 226D, Dupont) as a coupling agent. The apparatus used in this example was a 4.5 inch single screw vented extruder (L/D ratio 32:1) with a die assembly (FIG. 2) with proper dimension to produce a non-hollow profile (FIG. 3).

The processing conditions were as follows:
(i) Setting for the extruder barrel temperature control zones (upstream end to downstream end): 165, 165, 160, 160, 155, 155° C.
(ii) Setting for die assembly temperature control zones (die, die land, cooled shaper): 145, 140, 20° C.

The product has the following flexural strength and modulus: 48 MPa and 2.8 GPa.

Example 2

This example describes the production of a non-hollow corrugated profile as in example 1.

The thermoplastic compound used in this example is similar to example 1 except that the composition is 48 parts by weight of the same HDPE, 50 parts by weight of saw dust and 2 part by weight of maleated polyethylene. The same apparatus and processing conditions were used in this example as in Example 1. The product has the following flexural strength and modulus: 60 MPa and 3.5 GPa.

Example 3

This example describes the production of a non-hollow profile as in example 1.

The thermoplastic compound used in this example is similar to example 1 except that the composition is 38 parts by weight of the same HDPE, 60 parts by weight of saw dust and 2 part by weight of maleated polyethylene. The same apparatus and processing conditions were used in this example as in Example 1. The product has the following flexural strength and modulus: 69 MPa and 4.5 GPa.

Example 4

This example describes the production of the hollow profile of FIG. 6.

The thermoplastic compound used in this sample comprised 59 parts by weight fractional melt HDPE (MI=0.4) from milk bottles with no colour added (natural), 40 parts by weight ground wood waste/saw dust (20–80 mesh) and 1 part by weight of maleated polyethylene (Fusabond MB 226D, Dupont) as a coupling agent. The apparatus used in this example was a 4.5 inch single screw vented extruder (L/D ratio 32:1) with a die assembly (FIG. 4) with proper dimension to produce a non-hollow profile (FIG. 6).

The processing conditions were as follows:
(i) Setting for the extruder barrel temperature control zones (upstream end to downstream end): 165, 165, 160, 160, 155, 155° C.
(ii) Setting for die assembly temperature control zones (die, mandrel, cooled shaper): 155, 65, 20° C.

The product has the following flexural strength and modulus: 47 MPa and 2.8 GPa.

Example 5

This example describes the production of a hollow profile as in example 4.

The thermoplastic compound used in this example is similar to example 4 except that the composition is 38 parts by weight of the same HDPE, 60 parts by weight of saw dust and 2 part by weight of maleated polyethylene. The same apparatus and processing conditions were used in this example as in Example 4. The product has the following flexural strength and modulus: 68 MPa and 4.3 GPa.

What is claimed is:

1. An extrusion process for the manufacture of a thermoplastic resin-filler composite product having a desired resin-filler mixture comprised of 60–20% by weight of a thermoplastic resin and 40–80% by weight of a filler, said process comprising the steps of:
   i) extruding through a die said desired resin-filler mixture in a homogeneous form at a temperature above the softening point to allow deformation and relaxation of said resin to form an extrudate having a desired cross-sectional shape;

ii) passing said extrudate, at a temperature above said softening point, through a die land whereby to relax said extrudate passing through said die land;

iii) passing said extrudate from said die land to a cooled shaper through a thermal barrier insert member disposed in contact between said die land and said cooled shaper whereby radial pressure to counteract radial expansion tendencies of said extrudate is maintained during said passage through said thermal barrier and cooled shaper, said cooled shaper having cooling means to maintain said cooled shaper at a temperature of about at least 20° C. below said softening point of said resin to cool said extrudate whereby to form a solid outer skin on said extrudate to prevent die swell and melt fracture, and iv) applying lubricant to an exterior surface of said extrudate prior to feeding same to said cooled shaper.

2. An extrusion process as claimed in claim 1 wherein prior to step (i) there is provided the step of mixing in a high intensity mixer, and at a temperature above the melting resin, desired proportions of a resin and a filler material to form a homogeneous mixture.

3. An extrusion process as claimed in claim 2 wherein after said step of passing said extrudate through a cooled shaper there is provided the further step of passing said extrudate from said cooled shaper to a further cooling device to achieve complete solidification of said extrudate.

4. An extrusion process as claimed in claim 3 wherein there is further provided the step of conveying said extrudate from said cooled shaper, through said further cooling device and to cutting device to cut said cooled extrudate to form said resin-filler composite product.

5. An extrusion process as claimed in claim 2 wherein said step (iii) comprises controlling the temperature of said cooled shaper whereby said extrudate forms a solid skin on outer surfaces thereof, of sufficient thickness before exiting from said cooled shaper.

6. An extrusion process as claimed in claim 2 wherein said step (iv) comprises injecting a lubricant about an outer surface of said extrudate as it passes through said thermal barrier insert member.

7. An extrusion process as claimed in claim 2 wherein said step (iv) comprises adding a lubricant to said resin and filler in said high intensity mixer.

8. An extrusion process as claimed in claim 7 wherein said lubricant is an oil lubricant.

9. An extrusion process as claimed in claim 2 wherein said mixing step comprises mixing a thermoplastic polymer with an inorganic filler and/or cellulose fiber filler.

10. An extrusion process as claimed in claim 9 further including mixing a dispersing/coupling agent with said polymer and filler to improve dispersion and adhesion.

* * * * *